US012640807B2

(12) United States Patent
Wang et al.

(10) Patent No.: US 12,640,807 B2
(45) Date of Patent: May 26, 2026

(54) COMMUNICATION METHOD AND COMMUNICATION APPARATUS

(71) Applicant: Huawei Technologies Co., Ltd., Shenzhen (CN)

(72) Inventors: Yu Wang, Hangzhou (CN); Yunfei Qiao, Hangzhou (CN); Hejia Luo, Hangzhou (CN); Ying Chen, Hangzhou (CN); Rong Li, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 265 days.

(21) Appl. No.: 18/586,038

(22) Filed: Feb. 23, 2024

(65) Prior Publication Data

US 2024/0195487 A1 Jun. 13, 2024

Related U.S. Application Data

(63) Continuation of application No. PCT/CN2022/093681, filed on May 18, 2022.

(30) Foreign Application Priority Data

Aug. 24, 2021 (CN) .......................... 202110977668.1

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ............ H04B 7/18513; H04B 7/18519; H04B 7/18521; H04B 7/185
See application file for complete search history.

(56) References Cited

U.S. PATENT DOCUMENTS

2022/0416880 A1* 12/2022 Song ..................... H04W 76/12
2024/0031300 A1* 1/2024 Liu ..................... H04B 7/18513

FOREIGN PATENT DOCUMENTS

CN 104038318 A 9/2014

* cited by examiner

*Primary Examiner* — David E Lotter
(74) *Attorney, Agent, or Firm* — Slater Matsil, LLP

(57) ABSTRACT

A communication method and a communication apparatus are provided. The method includes: obtaining, by a first satellite, a PDU, where the PDU includes first information, the first information includes an identifier of a UPF agent, and the identifier of the UPF agent indicates one of one or more UPF agents associated with a last-hop satellite; and forwarding, by the first satellite, the PDU to a second satellite, where the second satellite is a next hop that is of the first satellite, that corresponds to the first information, and that is determined from at least one correspondence pre-stored by the first satellite, and each of the at least one group of correspondences indicates a correspondence between one piece of first information and a next hop.

19 Claims, 4 Drawing Sheets

200

210: A first satellite obtains a PDU

220: The first satellite forwards the PDU to a second satellite

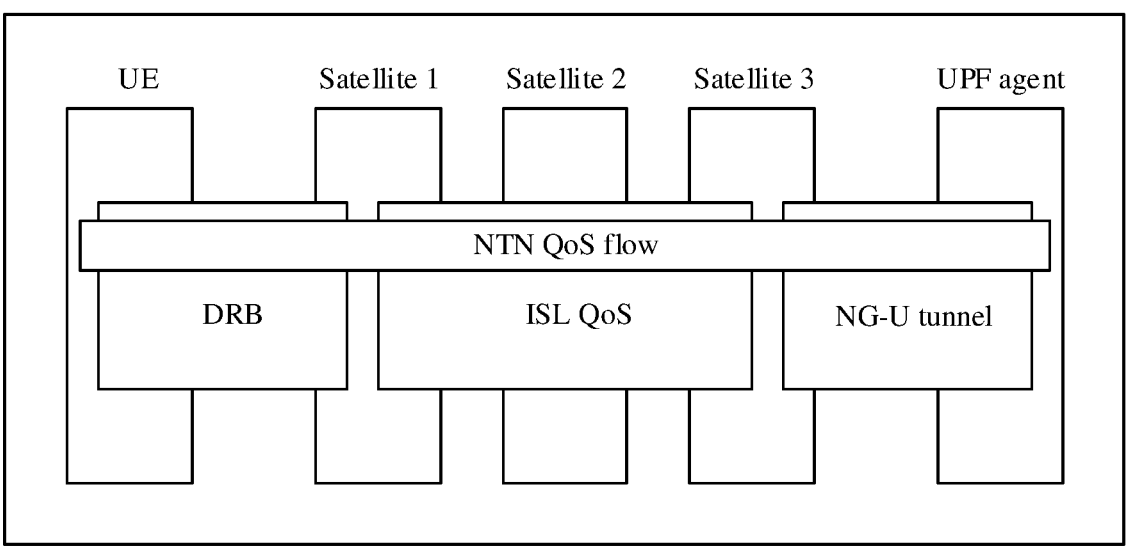
FIG. 3
| C/D | ISL QoS | Destination ID | Sequence number | Payload size | Payload data | Padding |
|-----|---------|----------------|-----------------|--------------|--------------|---------|
|     |         |                |                 |              |              |         |
FIG. 4
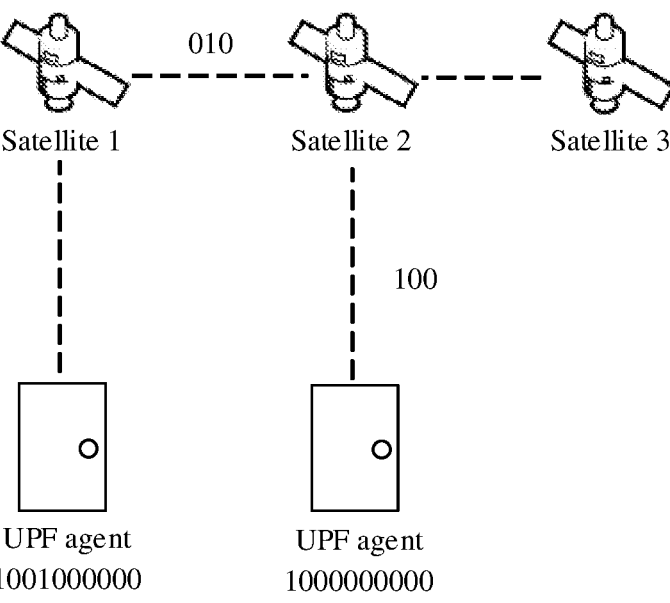
FIG. 5

COMMUNICATION METHOD AND COMMUNICATION APPARATUS

CROSS-REFERENCE TO RELATED APPLICATIONS

This disclosure is a continuation of International Application No. PCT/CN2022/093681, filed on May 18, 2022, which claims priority to Chinese Patent Application No. 202110977668.1, filed on Aug. 24, 2021. The disclosures of the aforementioned applications are hereby incorporated by reference in their entireties.

TECHNICAL FIELD

This application relates to the communication field, and more specifically, to a communication method and a communication apparatus.

BACKGROUND

Currently, during inter-satellite communication, a satellite used as a forwarding node needs to perform routing and forwarding based on an internet protocol (IP) address of a neighboring satellite. Because the IP address occupies a large quantity of bits, when there are a large quantity of satellites, coding is complex, and consequently a satellite processing delay and satellite overheads are large. This causes inter-satellite communication efficiency to be low. Therefore, this method is not applicable to frequent multi-hop inter-satellite forwarding in a super-large-scale satellite constellation.

SUMMARY

This application provides a communication method and a communication apparatus, to determine a next hop by using an identifier of a user plane function network element (UPF) agent in a forwarding table, so that inter-satellite communication efficiency is improved.

According to a first aspect, this application provides a communication method. The method may be performed by a first satellite, or may be performed by a component (for example, a chip or a chip system) disposed in the first satellite. This is not limited in this application.

For example, the method includes the following steps. A first satellite obtains a protocol data unit (PDU). The PDU includes first information. The first information includes an identifier of a UPF agent, and the identifier of the UPF agent indicates one of one or more UPF agents associated with a last-hop satellite. The first satellite forwards the PDU to a second satellite. The second satellite is a next hop that is of the first satellite, that corresponds to the first information, and that is determined from at least one correspondence pre-stored by the first satellite, and each of the at least one group of correspondences indicates a correspondence between one piece of first information and a next hop.

It should be noted that, the PDU may include the first information. The first information may include the identifier of the UPF agent, and the identifier of the UPF agent may indicate the one of one or more UPF agents associated with the last-hop satellite in a path (which is briefly referred to as a forwarding path below) for forwarding the PDU through an inter-satellite link. The forwarding path may include a plurality of satellites, where the plurality of satellites are a plurality of forwarding nodes configured to forward the PDU. The first satellite is any satellite other than the last-hop satellite in the forwarding path. The identifier of the UPF agent may be understood as an address of a terrestrial relay node that is associated with a UPF in a core network and that the PDU needs to reach.

It should be understood that each identifier of a UPF agent may indicate one UPF agent. A correspondence that is between the identifier of the UPF agent and the next hop and that is in the at least one correspondence is a correspondence between the UPF agent and the next hop. It should be noted that the next hop in the correspondence is specifically the next hop of the first satellite rather than a next hop of the UPF agent. The correspondence merely enables the next hop of the first satellite to be associated with the UPF agent, so that the first satellite finds the next hop of the first satellite.

Based on the foregoing solution, the first satellite may search, based on the identifier of the UPF agent, the pre-stored correspondence for the correspondence between the UPF agent and the next hop, to determine a next-hop satellite, and forward data to the next-hop satellite. In an entire process, routing and forwarding do not need to be performed based on an IP address of a neighboring satellite, so that a satellite processing delay and satellite overheads can be reduced, and inter-satellite communication efficiency can be improved. Therefore, this method is applicable to frequent multi-hop inter-satellite forwarding in a super-large-scale satellite constellation.

With reference to the first aspect, in some possible implementations, the first information may further include an inter-satellite link (ISL) quality of service (QoS) level, and the ISL QoS level indicates a QoS requirement of inter-satellite communication.

Based on the foregoing solution, the first satellite may search, based on the identifier of the UPF agent and the ISL QoS level, the pre-stored correspondence for a correspondence between the identifier of the UPF agent and the ISL QoS level and the next hop, to determine the next-hop satellite. When the QoS requirement of the inter-satellite communication is met, the data is forwarded to the next-hop satellite. In an entire process, the routing and the forwarding do not need to be performed based on the IP address of the neighboring satellite, so that the inter-satellite communication efficiency can be improved.

With reference to the first aspect, in some possible implementations, the ISL QoS level may be one of at least one predefined ISL QoS level, and the at least one ISL QoS level indicates different QoS requirements of the inter-satellite communication.

With reference to the first aspect, in some possible implementations, the first satellite encapsulates received data based on the first information to obtain the PDU.

Based on the foregoing solution, when the first satellite is a first-hop satellite in the forwarding path, that a first satellite obtains a PDU may further specifically include: encapsulating, by the first satellite based on the first information, data received from a UE to obtain the PDU.

Optionally, the first satellite may receive the first information from a core network.

Optionally, the first satellite may receive next generation (NG) interface signaling from the core network. The NG interface signaling may include the first information.

With reference to the first aspect, in some possible implementations, the first satellite receives the PDU from a previous hop.

Based on the foregoing solution, when the first satellite is a non-first-hop satellite in the forwarding path, that a first satellite obtains a PDU may further specifically include: receiving, by the first satellite, the PDU from the previous hop of the first satellite.

Optionally, after receiving the PDU, the first satellite may further decapsulate the PDU to obtain the first information.

With reference to the first aspect, in some possible implementations, the at least one group of correspondences may be pre-stored in a forwarding table.

Optionally, the forwarding table may include a status identifier. The status identifier may indicate a status of each entry in the forwarding table, and the status may include an active state and an inactive state.

Based on the foregoing solution, each satellite may maintain at least one forwarding table. After obtaining the PDU and learning of the identifier of the UPF agent, the first satellite may search the forwarding table for the next hop corresponding to the UPF agent, to determine the next-hop satellite, and forward the PDU to the next-hop satellite.

With reference to the first aspect, in some possible implementations, the first satellite includes a first protocol layer, and the first protocol layer may be for encapsulating and/or decapsulating the PDU.

The first protocol layer may be a protocol layer above a physical layer and below an IP layer. For example, the first protocol layer may be a protocol layer obtained by improving an existing data link layer or a medium access control (MAC) layer, or may be a protocol layer newly added between the data link layer or the MAC layer and the IP layer, or may be a protocol layer above the IP layer.

Based on the foregoing solution, the data does not need to pass through an IP layer of a satellite and a protocol layer above the IP layer, so that a quantity of protocol layers related in the inter-satellite communication is reduced, and the inter-satellite communication efficiency can be improved.

According to a second aspect, this application provides a communication apparatus, to implement the method according to any one of the first aspect or the possible implementations of the first aspect. The apparatus includes a corresponding unit or module for performing the foregoing method. The unit or module included in the apparatus may be implemented by software and/or hardware. The apparatus may be, for example, a first satellite, or may be a chip, a chip system, a processor, or the like that supports the first satellite in implementing the foregoing method, or may be a logic module or software that can implement all or some functions of the first satellite.

According to a third aspect, this application provides a communication apparatus. The communication apparatus includes a processor. The processor is coupled to a memory, and may be configured to execute a computer program in the memory, to implement the communication method according to any one of the possible implementations of the first aspect.

Optionally, the communication apparatus further includes the memory.

Optionally, the communication apparatus further includes a communication interface. The processor is coupled to the communication interface.

According to a fourth aspect, this application provides a chip system. The chip system includes at least one processor, configured to support implementation of the functions related in any one of the first aspect and the possible implementations of the first aspect, for example, receiving or processing data and/or information related in the foregoing method.

In a possible design, the chip system further includes a memory. The memory is configured to store program instructions and data, and the memory is located inside or outside the processor.

The chip system may include a chip, or may include a chip and another discrete component.

According to a fifth aspect, this application provides a computer-readable storage medium. The computer-readable storage medium stores a computer program (which may also be referred to as code or instructions); and when the computer program is run by a processor, the method according to any one of the first aspect and the possible implementations of the first aspect is performed.

According to a sixth aspect, this application provides a computer program product. The computer program product includes: a computer program (which may also be referred to as code or instructions). When the computer program is run, the method according to any one of the first aspect and the possible implementations of the first aspect is performed.

It should be understood that the second aspect to the sixth aspect of this application correspond to the technical solutions of the first aspect of this application, and beneficial effects achieved by the aspects and the corresponding feasible implementations are similar. Details are not described again.

BRIEF DESCRIPTION OF THE DRAWINGS

FIG. 3 is a schematic diagram of a quality of service flow (QoS flow) from a user equipment to a user plane function network element agent according to an embodiment of this application;

FIG. 4 is a schematic diagram of a format of a PDU according to an embodiment of this application;

FIG. 5 is a schematic diagram of a topology structure of inter-satellite communication according to an embodiment of this application;

DETAILED DESCRIPTION OF ILLUSTRATIVE EMBODIMENTS

Figures 1, 2:
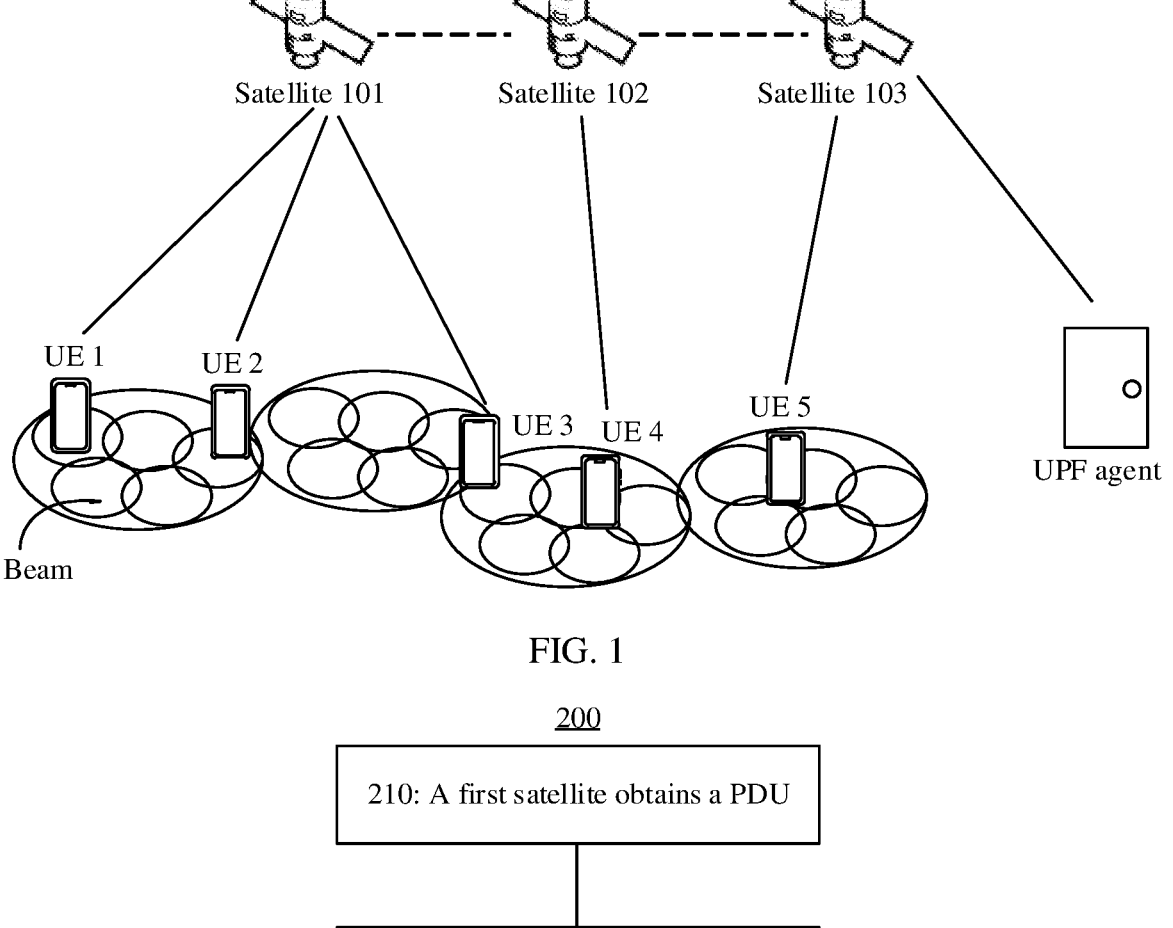
FIG. 1 is a schematic diagram of a satellite communication system according to an embodiment of this application.
FIG. 2 is a schematic flowchart of a communication method according to an embodiment of this application.

The following describes the technical solutions of this application with reference to the accompanying drawings.

In the specification and claims of this application, terms such as "first" and "second" are intended to distinguish between similar objects, but are unnecessarily intended to describe a specific order or sequence. It should be understood that data termed in such a way are interchangeable in proper circumstances so that embodiments of this application described herein can be implemented in other orders than the order illustrated or described herein. In addition, terms such as "include" and "have" and any other variants are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

In embodiments of this application, "at least one" means one or more, and "a plurality of" means two or more. A term "and/or" is an association relationship for describing associated objects and represents that three relationships may exist. For example, A and/or B may represent the following three cases: Only A exists, both A and B exist, and only B exists, where A and B may be singular or plural. A character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, and c; a and b; a and c; b and c; or a and b and c, where a, b, and c each may be singular or plural.

A non-terrestrial network (NTN) includes nodes such as a satellite network, a high altitude platform station, and an uncrewed aerial vehicle, and features global coverage, long-distance transmission, flexible networking, easy deployment, and no geographical restriction. The NTN has been widely used in many fields such as maritime communication, positioning and navigation, disaster relief, scientific experiments, video broadcasting, and ground observation. A 5th generation (5G) terrestrial mobile network and a satellite network are integrated to complement each other and form a global integrated communication network with seamless coverage of the sea, land, air, sky, and ground, meeting various service requirements of users everywhere.

As an important part of the NTN, a next generation satellite network presents a trend of ultra-density and heterogeneity. The satellite network is heterogeneous. With development from a conventional single-layer communication network to a multi-layer communication network, functions of a communication satellite network tend to be complex and diversified. The communication satellite network is gradually compatible with and supports functions such as navigation enhancement, ground observation, and in-orbit processing of multi-dimensional information.

The technical solutions in embodiments of this application may be applied to an NTN system such as a satellite communication system, a high altitude platform station (HAPS) communication system, and an uncrewed aerial vehicle, for example, an integrated communication and navigation (ICAN) system, a global navigation satellite system (GNSS), and an ultra-dense low-orbit satellite communication system. The satellite communication system may be integrated with a conventional mobile communication system. For example, the mobile communication system may be a 4th generation (4G) communication system (for example, a long term evolution (LTE) system), a worldwide interoperability for microwave access (WiMAX) communication system, a 5G communication system (for example, a new radio (NR) system), a future mobile communication system, or the like.

The satellite communication system may include a user equipment (UE) and a network device.

The user equipment may also be referred to as a user terminal, a mobile station, or the like. The user equipment mentioned in embodiments of this application may include various handheld devices, vehicle-mounted devices, wear-able devices, or computing devices having a wireless communication function, or another processing device connected to a wireless modem, an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, a terminal device in a 5G network or a future communication network, or the like.

The network device may include one or more satellites and ground station devices. The ground station device may also be referred to as a core network (CN) device. For example, the ground station device may be a device in a core network in an existing mobile communication architecture (for example, a 3rd generation partnership project (3GPP) access architecture of a 5G network) or a device in a core network in a future mobile communication architecture. As a bearer network, the core network provides an interface to a data network, provides communication connection, authentication, management, and policy control for a UE, bearers a data service, and so on. The core network may further include: network elements such as an access and mobility management function (AMF), a session management function (SMF), an authentication server function (AUSF), a policy control node (PCF), and a UPF. The AMF network element is configured to manage access and mobility that are of the UE, and is mainly responsible for functions such as UE authentication, UE mobility management, and UE paging.

A satellite may be a low earth orbit (LEO) satellite, a medium orbit earth (MEO) satellite, a high earth orbit (HEO) satellite, a geostationary earth orbit (GEO) satellite, a non-GEO (NGEO) satellite, or the like.

The network device may further include but is not limited to: an evolved nodeB (eNB), a baseband unit (BBU), an access point (AP) in a wireless fidelity (Wi-Fi) system, a wireless relay node, a wireless backhaul node, a transmission point (TP), or a transmission reception point (TRP), and the like. Alternatively, the network device may be a gNB, a TRP, or a TP in the 5G system, or one or a group of antenna panels (which includes a plurality of antenna panels) of a base station in the 5G system. In addition, the network device may alternatively be a network node included in a gNB or a TP, for example, a BBU or a distributed unit (DU). Alternatively, the network device may be a device responsible for a network side function in a device-to-device (D2D) communication system, a machine-to-machine (M2M) communication system, an internet of things (IoT) communication system, an internet of vehicles communication system, or another communication system.

FIG. 1 is a schematic diagram of a satellite communication system according to an embodiment of this application. The satellite communication system may include a satellite 101, a satellite 102, a satellite 103, a UPF agent, and a UE, for example, a UE 1, a UE 2, a UE 3, a UE 4, and a UE 5. For example, the satellite 103 may be connected to the UPF agent, and a satellite may perform wireless communication with the UPF agent. It should be understood that the UPF agent may be a ground station device, an NTN gateway, or another network device. The satellite may further perform wireless communication with the UE by broadcasting a communication signal, a navigation signal, and the like. Each satellite may provide a communication service, a navigation service, a positioning service, and the like for the UE by using a plurality of beams. The satellite uses the plurality of beams to cover a service area. Different beams may perform communication by using one or more of the following: time division, frequency division, and space division. An inter-satellite link may be established between satellites, and the satellites may process and forward data according to a protocol.

It should be understood that FIG. 1 is merely an example. In an actual scenario, more or fewer satellites, more or fewer UEs, and more core network devices may be further included. A quantity of satellites, a quantity of UEs, and a quantity of core network devices are not limited in this application.

The satellite communication system may include a transparent transmission satellite architecture and a non-transparent transmission satellite architecture. The transparent transmission is also referred to as bent-pipe forwarding transmission, to be specific, a signal on the satellite only performs frequency conversion and signal amplification, and the satellite is transparent to the signal. The non-transparent transmission may be referred to as regeneration (on-satellite access/processing) transmission, in other words, the satellite has some or all of functions of a base station. For example, the satellite 101 and the satellite 102 in FIG. 1 each may be a non-transparent transmission satellite architecture, and the satellite 103 may be a transparent transmission satellite architecture.

The satellite mentioned in embodiments of this application may be a satellite base station, or may include an orbit receiver or a repeater configured to relay information, or may be a network side device carried on the satellite. The satellite may be a LEO satellite, a MEO satellite, a HEO satellite, a GEO satellite, an NGEO satellite, or the like. This is not limited in this application.

Currently, during inter-satellite communication, a satellite used as a forwarding node needs to perform routing and forwarding based on an IP address of a neighboring satellite. Because the IP address occupies a large quantity of bits, when there are a large quantity of satellites, coding is complex, and consequently a satellite processing delay and satellite overheads are large. In addition, data needs to pass through an IP layer or the IP layer and a layer above the IP layer, a large quantity of layers of a protocol stack are related, the processing delay and the overheads are further increased, and inter-satellite communication efficiency is low. Therefore, this method is not applicable to frequent multi-hop inter-satellite forwarding in a super-large-scale satellite constellation.

Therefore, this application provides a communication method and a communication apparatus. The satellite may search, based on an identifier of a UPF agent, a pre-stored correspondence for a correspondence between the identifier of the UPF agent and a next hop, to determine a next-hop satellite, and forward data to the next-hop satellite. In an entire process, the routing and the forwarding do not need to be performed based on the IP address of the neighboring satellite, so that the inter-satellite communication efficiency can be improved. In addition, the data may not need to pass through the IP layer and the protocol layer above the IP layer, so that the quantity of layers of the protocol stack is reduced, and the inter-satellite communication efficiency can be further improved.

The following describes the communication method provided in embodiments of this application with reference to the accompanying drawings.

FIG. 2 is a schematic flowchart of a communication method according to an embodiment of this application. The method 200 includes step 210 to step 220. The following describes step 210 to step 220 in detail.

In step 210, a first satellite obtains a PDU.

It should be noted that, the PDU may include first information. The first information may include an identifier of a UPF agent, and the identifier of the UPF agent may indicate one of one or more UPF agents associated with a last-hop satellite in a path (which is briefly referred to as a forwarding path below) for forwarding the PDU through an inter-satellite link. The forwarding path may include a plurality of satellites, where the plurality of satellites are a plurality of forwarding nodes configured to forward the PDU. The first satellite is any satellite other than the last-hop satellite in the forwarding path. The identifier of the UPF agent may be understood as an address of a terrestrial relay node that is associated with a UPF in a core network and that the PDU needs to reach.

As described above, the UPF agent may be a ground station device, an NTN gateway, or another network device.

It should be understood that each satellite may be associated with one or more UPF agents.

The identifier of the UPF agent in this embodiment of this application may not depend on an identifier of a satellite. The identifier of the UPF agent may not occupy excessively many bits, and a small quantity of bits may be used for identifying a large quantity of UPF agents. For example, the identifier of the UPF agent uses 10 bits to identify different UPFs, and may identify 1024 UPF agents. For example, "1000000000" may be an example of an identifier of a UPF. It should be understood that a specific quantity of bits used by the identifier of the UPF agent is not limited in this application.

Based on step 210, the first satellite may learn of an address of a terrestrial relay node that is associated with a UPF in a core network and that the PDU needs to reach.

In step 220, the first satellite forwards the PDU to a second satellite.

It should be noted that, the second satellite may be a next hop that is of the first satellite, that corresponds to the first information, and that is in at least one correspondence pre-stored by the first satellite. In other words, the second satellite may be the next hop of the first satellite in an inter-satellite communication path. Each of the at least one group of correspondences pre-stored by the first satellite may indicate one piece of first information and a next hop corresponding to the first information.

It should be understood that each satellite may pre-store at least one group of correspondences, and the at least one group of correspondences may be determined based on a topology structure of a satellite constellation.

Based on step 220, the first satellite may determine, by using the correspondence, the next hop of the first satellite in the inter-satellite communication path, and forward the PDU including the identifier of the UPF agent to the next hop. In other words, the first satellite may notify the next-hop satellite of the first satellite of the address of the terrestrial relay node that is associated with the UPF in the core network and that the PDU needs to reach.

For example, the satellite 101 in FIG. 1 may be the first satellite. The satellite 101 may obtain the PDU. The satellite 101 may know the address of the terrestrial relay node that is associated with the UPF in the core network and that the PDU needs to reach, and may determine a next hop from at least one group of correspondences that is pre-stored by the satellite 101 and that is between the address of the terrestrial relay node that is associated with the UPF in the core network and the next hop. If the satellite 101 determines that the next hop is the satellite 102, the satellite 101 may forward the PDU to the satellite 102. Similarly, after obtaining the PDU, the satellite 102 may also know the address of the terrestrial relay node that is associated with the UPF in the core network and that the PDU needs to reach, and may determine a next hop from at least one group of correspondences that is pre-stored by the satellite 102 and that is between the address of the terrestrial relay node that is associated with the UPF in the core network and the next hop. If the satellite 102 determines that the next hop is the satellite 103, the satellite 102 may forward the PDU to the satellite 103. After obtaining the PDU, the satellite 103 may also know the address of the terrestrial relay node that is associated with the UPF in the core network and that the PDU needs to reach, and may determine a next hop from at least one group of correspondences that is pre-stored by the satellite 103 and that is between the address of the terrestrial relay node that is associated with the UPF in the core network and the next hop. If the next hop determined by the satellite 103 is a UPF agent associated with the satellite 103, the satellite 103 may send the PDU to the UPF agent.

In a possible implementation, the first information further includes an ISL QoS level.

The ISL QoS level may be one of at least one predefined ISL QoS level, and the at least one ISL QoS level indicates different QoS requirements of the inter-satellite communication.

It should be understood that the ISL QoS level may indicate a QoS requirement of data for the inter-satellite communication, and the ISL QoS level provides a function of mapping a QoS flow to inter-satellite link QoS. As shown in FIG. 3, a complete NTN QoS flow may be decomposed into a data radio bearer (DRB) that is from a UE to a satellite (for example, a satellite 1), ISL QoS that is from a satellite to a satellite (for example, the satellite 1 to a satellite 2 and the satellite 2 to a satellite 3), and an NG interface-U tunnel (which may be referred to as an NG-U tunnel for short) that is from a satellite (for example, the satellite 3) to an UPF agent. ISL QoS is newly added in an NTN scenario, and may be used for guaranteeing QoS of multi-hop inter-satellite forwarding.

In this implementation, the first satellite may obtain the QoS requirement of the data for the inter-satellite communication and the address of the terrestrial relay node that is associated with the UPF in the core network and that the PDU needs to reach, and may notify, after determining the next hop based on the pre-stored correspondence, the next hop of the QoS requirement of the data for the inter-satellite communication and the address of the terrestrial relay node that is associated with the UPF in the core network and that the PDU needs to reach.

In a possible implementation, to support multi-hop inter-satellite forwarding during inter-satellite communication, a new information element may be added to an NG interface, and may indicate the first information (the identifier of the UPF agent, or the identifier of the UPF agent and the ISL QoS level) corresponding to establishment of the inter-satellite link. A session establishment message may include the first information. The satellite may encapsulate the first information in a header of the PDU, so that fast forwarding of data between satellites can be assisted.

For example, a name of the information element (IE) may be NGAP-session-configuration IE (NGAP-Session-Configuration information element), and may include two variables: an identifier of ISL-QoS (ID-ISL-QoS) and an identifier of a UPF agent (ID-UPF-Agent). The identifier of ISL-QoS may also be defined as an ISL-QoS level, and a specific value may be an integer from 0 to M−1. A value of the identifier of the UPF agent may be an integer from 0 to N−1, where M and N are both positive integers, and M represents a quantity of identifiers of ISL-QoS, in other words, a quantity of ISL-QoS levels; and N represents a quantity of identifiers of UPF agents, in other words, a quantity of UPF agents.

It should be understood that a name of the information element and names and quantities of the variables included in the information element are merely examples, and should not constitute any limitation on this application.

In a possible implementation, the PDU may further include one or more pieces of information such as a type identifier of the PDU, a sequence number of the PDU, a load size, payload data, or a padding character.

FIG. 4 is a schematic diagram of a format of a PDU according to an embodiment of this application.

For example, the PDU may include one or more of fields such as C/D, ISL QoS, a destination ID (Dst ID), a sequence number (SN), a payload size, payload data (data), and padding. The C/D may indicate the type identifier of the PDU, where C may indicate that the PDU is a control plane PDU, and D may indicate that the PDU is a data plane PDU. The SN may indicate the sequence number of the PDU, and may be used for sorting segmented PDUs. The payload size may indicate a size of the payload data. The payload data may be control plane data or user plane data. Specifically, the padding field may be filled with 0, to pad a control plane payload or a user plane payload, so that the PDU complies with a format (for example, byte alignment, to be specific, a format of a PDU is an integer multiple of a byte) specified by the PDU, and therefore, requirements of different physical layers and data link layers on transmission capabilities can be met. The ISL QoS may indicate the ISL QoS level, and the destination ID indicates the identifier of the UPF agent.

It should be understood that the format of the PDU shown in FIG. 4 is merely an example, a sequence of the foregoing information is variable, and a specific field of the foregoing information may also be represented in another form. A quantity of pieces of the foregoing information included in the PDU, and a representation form and a sequence that are of fields are not limited in this application.

Optionally, the at least one group of correspondences is pre-stored in a forwarding table.

In this possible implementation, each satellite may maintain at least one forwarding table, and the forwarding table may include a correspondence between first information and a next hop. It should be understood that the forwarding table may be obtained through calculation by a UPF agent in each area based on ephemeris information, and is transmitted, by the UPF agent, to a satellite associated with the UPF agent. The UPF agent may establish the forwarding table by using a constrained shortest path algorithm, or may establish the forwarding table by using another algorithm. This is not limited in this application.

For example, the first information includes an identifier of the UPF agent and an ISL QoS level, and the forwarding table may be shown in table 1. Table 1 may include at least one group of correspondences between the identifier of the UPF agent and the next hop and between the ISL QoS level and the next hop.

TABLE 1

| ISL QoS level | Identifier of a UPF agent | Next hop |
|---|---|---|
| 1 | 1000000000 | 100 |
| 3 | 1001000000 | 010 |

Table 1 may be a forwarding table maintained by the satellite 2 shown in FIG. 5. It should be understood that an address of a next hop in a forwarding table maintained by each satellite may be addressed based on a port number (for example, "010") of the satellite corresponding to an inter-satellite link and a port number (for example, "100") of the satellite corresponding to a satellite-to-ground link (which is a link between the satellite and a ground station device). This addressing manner occupies fewer bits than a manner of performing routing and forwarding based on an IP address of a neighboring satellite, and is a lightweight forwarding table, so that storage overheads of the satellite can be reduced.

When the PDU including the ISL QoS level being 1 and the identifier of the UPF agent being "1000000000" reaches the satellite 2, the satellite 2 may search the forwarding table for a next hop corresponding to the ISL QoS level being 1 and the identifier of the UPF agent being "1000000000", that is, "100". It can be determined that the satellite 2 needs to forward the PDU to a port "100" of the satellite 2, in other words, the satellite 2 needs to forward the PDU to the next hop through the port "100" of the satellite 2. It should be understood that, that a satellite determines a port number corresponding to a link that needs to pass through is equivalent to that a next hop is determined.

It should be understood that "1000000000", "1001000000", "100", and "010" that are in table 1 all use a binary coding scheme. It should be further understood that the port number corresponding to the inter-satellite link corresponding to the next hop and the port number corresponding to the satellite-to-ground link may alternatively be represented by using a decimal coding scheme.

Optionally, the forwarding table may further include a status identifier. The status identifier may indicate a status of each entry in the forwarding table, and the status may include an active state and an inactive state. The active state may be understood that the entry can be used normally, and the inactive state may be understood that the entry cannot be used normally or the entry does not exist.

Table 2 and table 3 are different forwarding tables maintained by a same satellite at different moments. As shown in table 2 or table 3, the forwarding table may include a status identifier, and may further include a time period (for example, a time period [T1, T2] and a time period [T2, T3]).

TABLE 2

| Time period | ISL QoS level | Identifier of a UPF agent | Next hop | Status |
|---|---|---|---|---|
| [T1, T2] | 1 | 1000000000 | 001 | Active |
| [T1, T2] | 2 | 1001000000 | 010 | Active |
| [T1, T2] | 3 | 1000000001 | 100 | Inactive |

TABLE 3

| Time period | ISL QoS level | Identifier of a UPF agent | Next hop | Status |
|---|---|---|---|---|
| [T2, T3] | 1 | 1000000000 | 001 | Active |
| [T2, T3] | 2 | 1001000000 | 010 | Active |
| [T2, T3] | 3 | 1000000001 | 100 | Inactive |
| [T2, T3] | 3 | 1000000001 | 101 | Active |

A satellite may start a corresponding forwarding table based on a timestamp and a clock of the satellite, or may select a corresponding entry based on modulus values of the clock and the timestamp. For example, assuming that a current clock is T0, if T0 is in the time period [T1, T2], the satellite may choose to perform forwarding based on a corresponding entry that is in an active state and that is in table 2. If T0 is in the time period [T2, T3], the satellite may choose to perform forwarding based on a corresponding entry that is in an active state and that is in table 3.

In view of a dynamic nature of an NTN network topology, the forwarding table on the satellite needs to be updated periodically. Therefore, by using a control plane PDU or directly requesting the UPF agent, the forwarding table may be updated and maintained periodically or based on an event, for example, that a service packet loss rate or a delay does not meet a requirement.

When the first satellite is a first-hop satellite in an inter-satellite communication forwarding path, that a first satellite obtains a PDU may further specifically include: encapsulating, by the first satellite based on the first information, data received from a UE to obtain the PDU, where the first information may be received by the first satellite from a core network.

In a possible implementation, the first satellite may receive NG interface signaling from the core network. The NG interface signaling may include the first information, and the first satellite may encapsulate, based on the first information, the data received from the UE to obtain the PDU.

For example, assuming that the satellite 101 in FIG. 1 is the first satellite, the satellite 101 is the first-hop satellite in the inter-satellite communication forwarding path. The satellite 101 may receive the NG interface signaling from the core network, to obtain the first information. The first information may include the identifier of the UPF agent and the ISL QoS level, and encapsulate, based on the identifier of the UPF agent and the ISL QoS level, the data received from the UE to obtain the PDU. The satellite 101 may find, from a pre-stored forwarding table, a next hop corresponding to the identifier of the UPF agent and the ISL QoS level. Addressing of the next hop may be an identifier of the satellite 102, or may be a port number of the satellite 101 corresponding to an inter-satellite link between the satellite 101 and the satellite 102. The satellite 101 may forward the PDU to the satellite 102 through a port of the satellite 101.

When the first satellite is a non-first-hop satellite in the inter-satellite communication forwarding path, that a first satellite obtains a PDU may further specifically include: receiving, by the first satellite, the PDU from a previous hop of the first satellite. After receiving the PDU, the first satellite may further decapsulate the PDU, to obtain the first information, and may determine the next hop based on the pre-stored correspondence and the first information.

For example, assuming that the satellite 102 in FIG. 1 is a first satellite, the satellite 102 is a non-first-hop satellite in a forwarding path. The satellite 102 may receive the PDU from the previous-hop satellite 101 of the satellite 102. The satellite 102 may decapsulate the PDU to learn of the identifier of the UPF agent and the ISL QoS level. The satellite 102 may find, from the pre-stored forwarding table, the next hop corresponding to the identifier of the UPF agent and the ISL QoS level. Addressing of the next hop may be an identifier of the satellite 103, or may be a port number corresponding to a link between the satellite 102 and the satellite 103. The satellite 102 may forward the PDU to the satellite 103 through a port of the satellite 102.

When the first satellite is a last-hop satellite in the inter-satellite communication forwarding path, the first satellite may receive the PDU from a previous hop of the first satellite, and may decapsulate the PDU to obtain the first information and payload data. The next hop may be found in the pre-stored correspondence based on the first information. It should be understood that the next hop may be a ground station device corresponding to the UPF agent associated with the first satellite. However, an encoding address of the next hop may be a port number of the first satellite corresponding to the satellite-to-ground link between the first satellite and the ground station device corresponding to the UPF agent associated with the first satellite. The first satellite may encapsulate the payload data in an encapsulation manner of an existing data encapsulation format, and send the payload data to the next hop through the port of the first satellite. The encapsulation manner of the existing data encapsulation format may be, for example, IP-based encapsulation. This is not limited in this application.

In a possible design, the first satellite may include a first protocol layer, and the first protocol layer may be for encapsulating and/or decapsulating the PDU.

Figure 6:
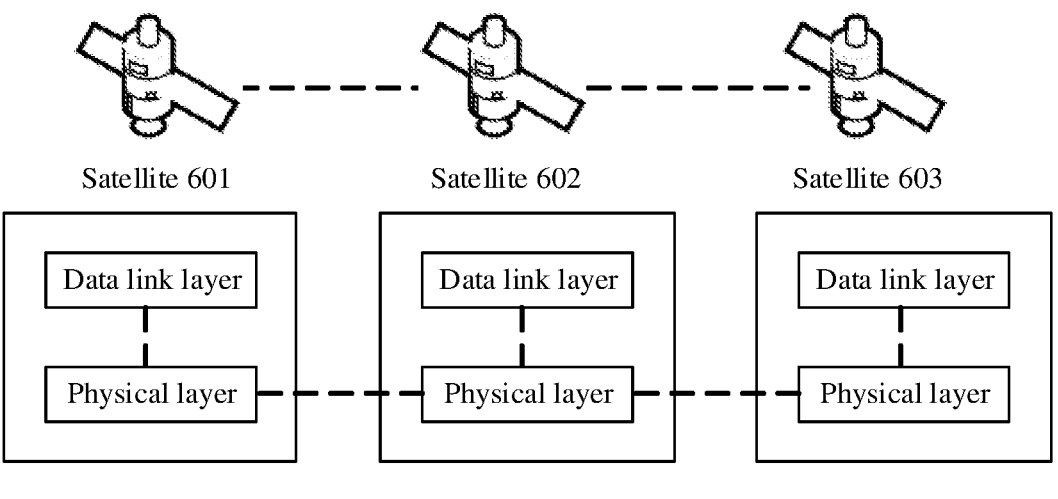
FIG. 6 is a schematic diagram of a structure of a protocol stack of a satellite according to an embodiment of this application.

The first protocol layer may be a protocol layer above a physical layer and below an IP layer. For example, the first protocol layer may be a data line layer or a medium access control (MAC) layer. In other words, the data link layer or the MAC layer may be configured to implement encapsulation and/or decapsulation of the PDU. This is similar to that a function of encapsulating and/or decapsulating the PDU is defined for an existing data link layer or MAC layer. As shown in FIG. 6, data link layers or MAC layers of a satellite 601, a satellite 602, and a satellite 603 may all have a function of a first protocol layer. Both a user plane protocol stack and a control plane protocol stack that are of a satellite may be a first protocol layer and a physical layer from top to bottom. The first protocol layer of the user plane protocol stack may implement data forwarding between satellites, and may replace a conventional NR IP layer. The first protocol layer of the control plane protocol stack may implement exchange of a control message related to data forwarding between satellites, or may replace a conventional NR IP layer.

Figure 7:
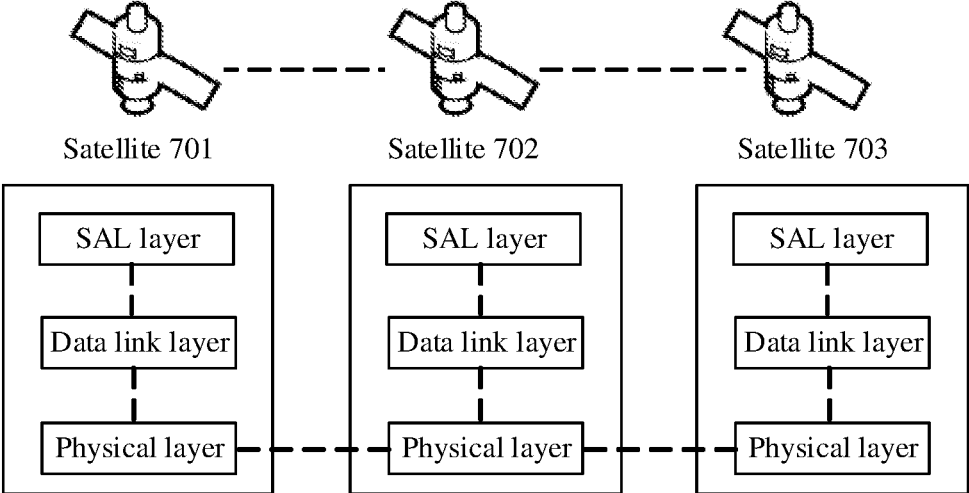
FIG. 7 is a schematic diagram of a structure of a protocol stack of another satellite according to an embodiment of this application.

For another example, the first protocol layer is an adaptive layer (AL), and the adaptive layer may be located at a data link layer or between a MAC layer and an IP layer, in other words, a new protocol layer is added between an existing data link layer or between the MAC layer and the IP layer. Because the AL is applied to an inter-satellite link, the AL may also be referred to as an inter-satellite adaptive layer (SAL) or an NTN-AL. As shown in FIG. 7, a satellite 701, a satellite 702, and a satellite 703 each have a SAL. The SAL is located between a data link layer and an IP layer and is for encapsulating and/or decapsulating a PDU. Both a user plane protocol stack and a control plane protocol stack that are of a satellite may be a SAL, a data link layer and a physical layer from top to bottom. The SAL of the user plane protocol stack may implement data forwarding between satellites, and may replace a conventional NR IP layer. The SAL of the control plane protocol stack may implement exchange of a control message related to data forwarding between satellites, or may replace a conventional NR IP layer.

It should be understood that the AL and the SAL are merely possible names of the first protocol layer, and should not constitute any limitation on embodiments of this application.

Based on the foregoing solution, the satellite may not only search, based on an identifier of a UPF agent, a pre-stored correspondence for a correspondence between the identifier of the UPF agent and a next hop, to determine the next hop, but also forward data to a next-hop satellite. In an entire process, routing and forwarding do not need to be performed based on an IP address of a neighboring satellite, so that inter-satellite communication efficiency can be improved. In addition, the data may not need to pass through an IP layer and a protocol layer above the IP layer, so that a quantity of layers of the protocol stack is reduced, and the inter-satellite communication efficiency can be further improved.

To implement functions in the method provided in the foregoing embodiments of this application, each satellite or network element may include a hardware structure and/or a software module, and implement the foregoing functions in a form of the hardware structure, the software module, or a combination of the hardware structure and the software module. Whether a function in the foregoing functions is performed using the hardware structure, the software module, or the combination of the hardware structure and the software module depends on particular applications and design constraints that are of the technical solutions.

Figure 8:
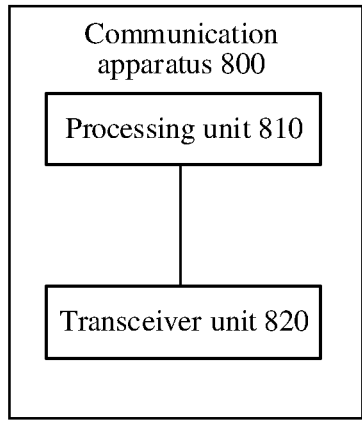
FIG. 8 is a schematic block diagram of a communication apparatus according to an embodiment of this application.

FIG. 8 is a schematic block diagram of a communication apparatus according to an embodiment of this application. As shown in FIG. 8, the communication apparatus 800 may include: a processing unit 810 and a transceiver unit 820. The apparatus 800 may be configured to perform the steps of the communication method 200.

When the communication apparatus 800 is configured to perform the steps of the communication method 200, the processing unit 810 may be configured to obtain a PDU. The PDU may include first information. The first information may include an identifier of a UPF agent, and the identifier of the UPF agent may indicate one of one or more UPF agents associated with a last-hop satellite. The transceiver unit 820 may be configured to forward the PDU to a second satellite. The second satellite may be a next hop that is of a first satellite and that corresponds to the first information and that is determined from at least one correspondence pre-stored by the first satellite, and each of the at least one group of correspondences may indicate a correspondence between one piece of first information and a next hop.

Optionally, the first information may further include an ISL QoS level, and the ISL QoS level indicates a QoS requirement of inter-satellite communication.

Optionally, the ISL QoS level may be one of at least one predefined ISL QoS level, and the at least one ISL QoS level indicates different QoS requirements of the inter-satellite communication.

Optionally, the processing unit 810 may be further configured to encapsulate received data based on the first information to obtain the PDU.

Optionally, the transceiver unit 820 may be configured to receive the first information from a core network.

Optionally, the transceiver unit 820 may be further configured to receive NG interface signaling from the core network. The NG interface signaling may include the first information.

Optionally, the transceiver unit 820 may be further configured to receive the PDU from a previous hop.

Optionally, the processing unit 810 may be further configured to decapsulate the PDU to obtain the first information.

Optionally, the at least one group of correspondences may be pre-stored in a forwarding table.

Optionally, the forwarding table may include a status identifier. The status identifier may indicate a status of each entry in the forwarding table, and the status may include an active state and an inactive state.

Optionally, the processing unit 810 may include a first protocol layer, and the first protocol layer may be for encapsulating and/or decapsulating the PDU.

Figure 9:
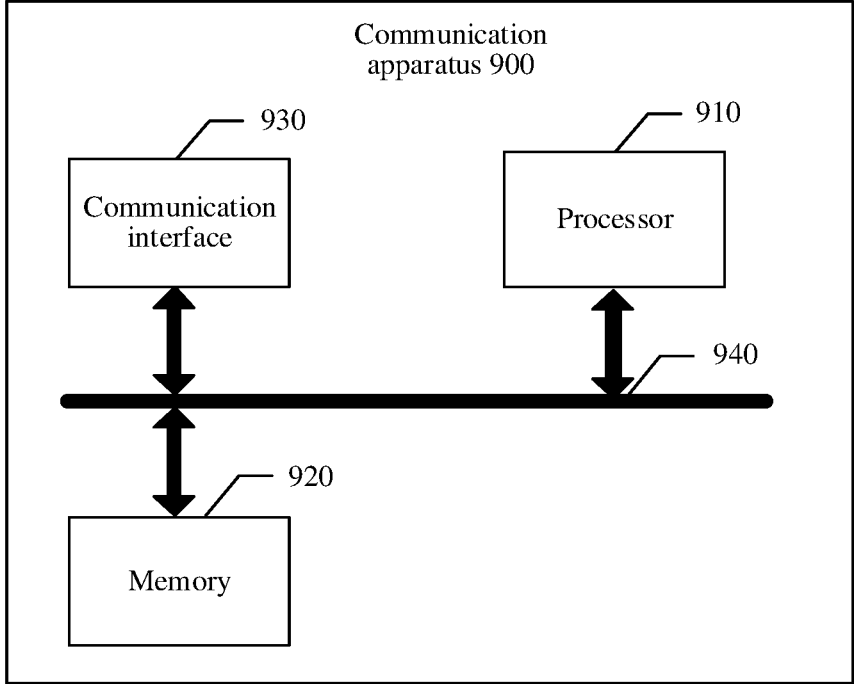
FIG. 9 is a schematic block diagram of another communication apparatus according to an embodiment of this application.

FIG. 9 is a schematic block diagram of another communication apparatus according to an embodiment of this application. The communication apparatus 900 may be configured to implement a function of the first satellite in the foregoing method. The apparatus 900 may be a chip system. In this embodiment of this application, the chip system may include a chip, or may include a chip and another discrete component.

As shown in FIG. 9, the communication apparatus 900 may include at least one processor 910, configured to implement a function of the first satellite in the method provided in embodiments of this application.

For example, when the communication apparatus 900 is configured to implement the function of the first satellite in the communication method provided in embodiments of this application, the processor 910 may be configured to obtain a PDU. The PDU may include first information. The first information may include an identifier of a UPF agent, and the identifier of the UPF agent may indicate one of one or more UPF agents associated with a last-hop satellite. The PDU is forwarded to a second satellite. The second satellite may be a next hop that is of the first satellite, that corresponds to the first information, and that is determined from at least one correspondence pre-stored by the first satellite, and each of the at least one group of correspondences may indicate a correspondence between one piece of first information and a next hop. For details, refer to detailed descriptions in the method example. Details are not described herein again.

The communication apparatus 900 may further include at least one memory 920, configured to store program instructions and/or data. The memory 920 is coupled to the processor 910. A coupling in this embodiment of this application may be an indirect coupling or a communication connection between apparatuses, units, or modules in an electrical form, a mechanical form, or another form, and is used for information exchange between the apparatuses, the units, or the modules. The processor 910 may cooperate with the memory 920. The processor 910 may execute program instructions stored in the memory 920. At least one of at least one memory may be included in a processor.

The communication apparatus 900 may further include a communication interface 930, configured to communicate with another device through a transmission medium, so that an apparatus in the communication apparatus 900 may communicate with the another device. For example, the another device may be a core network, a second satellite, or a UE. The communication interface 930 may be, for example, a transceiver, an interface, a bus, a circuit, or an apparatus that can implement receiving and sending functions. The processor 910 may receive and send data and/or information through the communication interface 930, and is configured to implement the method performed by the first satellite in the embodiment corresponding to FIG. 9.

A specific connection medium between the processor 910, the memory 920, and the communication interface 930 is not limited in this embodiment of this application. In this embodiment of this application, in FIG. 9, the processor 910, the memory 920, and the communication interface 930 are connected through a bus 940. The bus 940 is represented by a thick line in FIG. 9, and a connection manner between other components is merely described as an example, and is not limited thereto. The bus may be classified into an address bus, a data bus, a control bus, and the like. For ease of representation, only one thick line is used for representing the bus in FIG. 9, but this does not mean that there is only one bus or only one type of bus.

This application further provides a chip system. The chip system includes at least one processor, configured to implement the functions related in the method performed by the first satellite in the embodiment shown in FIG. 2, for example, receiving or processing data and/or information related in the foregoing method.

In a possible design, the chip system further includes a memory. The memory is configured to store program instructions and data, and the memory is located inside or outside the processor.

The chip system may include a chip, or may include a chip and another discrete component.

This application further provides a computer program product. The computer program product includes: a computer program (which may also be referred to as code or instructions); and when the computer program is run, the first satellite is enabled to perform the method of the embodiment in the embodiment shown in FIG. 2.

This application further provides a computer-readable storage medium. The computer-readable storage medium stores a computer program (which may also be referred to as code or instructions). When the computer program is run, the first satellite is enabled to perform the method of the embodiment in the embodiment shown in FIG. 2.

It should be understood that, the processor in embodiments of this application may be an integrated circuit chip, and has a signal processing capability. In an implementation process, steps in the foregoing method embodiments may be implemented using an integrated logic circuit of hardware in the processor, or using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the method, the steps, and logical block diagrams that are disclosed in embodiments of this application. The general-purpose processor may be a microprocessor, or the processor may be any conventional processor or the like. The steps of the method disclosed with reference to embodiments of this application may be directly executed and accomplished using a hardware decoding processor, or may be executed and accomplished using a combination of hardware and software modules in the decoding processor. A software module may be located in a storage medium that is mature in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable ROM (PROM), an erasable PROM (erasable PROM, EPROM), an electrically EPROM (electrically EPROM, EEPROM), or a flash memory. The volatile memory may be a random access memory (RAM), and is used as an external cache. Through example but not limitative descriptions, many forms of RAMs may be used, for example, a static RAM (SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM). It should be noted that the memory of the systems and method described in this specification includes but is not limited to these and any memory of another proper type.

The terms such as "unit" and "module" used in this specification may indicate computer-related entities, hardware, firmware, combinations of hardware and software, software, or software being executed.

A person of ordinary skill in the art may be aware that, various illustrative logical blocks and steps described with reference to the embodiments disclosed in this specification may be implemented using electronic hardware or a combination of computer software and electronic hardware. Whether the functions are performed using hardware or software depends on particular applications and design constraint conditions that are of the technical solutions. A person skilled in the art may use a different method to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiments are merely examples. For example, division of the units is merely division of logical functions and there may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in an electronic, a mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

In the foregoing embodiments, a part or all of the functions of the functional units may be implemented using software, hardware, firmware, or any combination thereof.

When the software is used for implementation, the part or all of the embodiments may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), or an optical medium (for example, a digital video disc (DVD)), a semiconductor medium (for example, a solid-state disk (SSD)), or the like.

When the functions are implemented in the form of a software functional unit and sold or used as an independent product, the functions may be stored in one computer-readable storage medium. Based on such an understanding, the technical solutions of this application essentially, or the part contributing to the conventional technology, or some of the technical solutions may be implemented in a form of a software product. The software product is stored in a storage medium, and includes several instructions for enabling a computer device (which may be a personal computer, a server, a network device, or the like) to perform all or some of the steps of the method described in embodiments of this application. The foregoing storage medium includes: any medium that can store program code, such as a USB flash drive, a removable hard disk drive, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining, by a first satellite, a protocol data unit (PDU), wherein the PDU comprises first information, the first information comprises an identifier of a user plane function network element (UPF) agent, and the identifier of the UPF agent indicates one of one or more UPF agents associated with a last-hop satellite; and forwarding, by the first satellite, the PDU to a second satellite, wherein the second satellite is a next hop that is of the first satellite, that corresponds to the first information, and that is determined from at least one correspondence pre-stored by the first satellite, and each of the at least one correspondence indicates a correspondence between one piece of first information and a next hop.

2. The method according to claim 1, wherein the first information further comprises an inter-satellite link (ISL) quality of service (QoS) level, and the ISL QoS level indicates a QoS requirement of inter-satellite communication.

3. The method according to claim 2, wherein the ISL QoS level is one of at least one predefined ISL QoS level, and each of the at least one predefined ISL QoS level indicates different QoS requirements of the inter-satellite communication.

4. The method according to claim 3, wherein obtaining, by the first satellite, the PDU comprises:
encapsulating, by the first satellite, received data based on the first information to obtain the PDU.

5. The method according to claim 4, further comprising:
receiving, by the first satellite, the first information from a core network.

6. The method according to claim 5, wherein receiving, by the first satellite, the first information from the core network comprises:
receiving, by the first satellite, next generation (NG) interface signaling from the core network, wherein the NG interface signaling comprises the first information.

7. The method according to claim 1, wherein obtaining, by the first satellite, the PDU comprises:
receiving, by the first satellite, the PDU from a previous hop.

8. The method according to claim 7, further comprising:
decapsulating, by the first satellite, the PDU to obtain the first information.

9. The method according to claim 1, wherein the at least one correspondence is pre-stored in a forwarding table.

10. The method according to claim 9, wherein the forwarding table comprises a status identifier, the status identifier indicates a status of each entry in the forwarding table, and each status comprises an active state and an inactive state.

11. The method according to claim 1, wherein the first satellite comprises a first protocol layer, and the first protocol layer is for encapsulating or decapsulating the PDU.

12. A first satellite, comprising:
at least one processor; and
a non-transitory computer readable storage medium storing a program that is executable by the at least one processor, the program including instructions for:
obtaining a protocol data unit (PDU), wherein the PDU comprises first information, the first information comprises an identifier of a user plane function network element (UPF) agent, and the identifier of the UPF agent indicates one of one or more UPF agents associated with a last-hop satellite; and
forwarding the PDU to a second satellite, wherein the second satellite is a next hop that is of the first satellite, that corresponds to the first information, and that is determined from at least one correspondence pre-stored by the first satellite, and each of the at least one correspondence indicates a correspondence between one piece of first information and a next hop.

13. The first satellite according to claim 12, wherein the first information further comprises an inter-satellite link (ISL) quality of service (QoS) level, and the ISL QoS level indicates a QoS requirement of inter-satellite communication.

14. The first satellite according to claim 13, wherein the ISL QoS level is one of at least one predefined ISL QoS level, and each of the at least one predefined ISL QoS level indicates different QoS requirements of the inter-satellite communication.

15. The first satellite according to claim 12, wherein obtaining the PDU comprises:
encapsulating, by the first satellite, received data based on the first information to obtain the PDU.

16. A non-transitory computer-readable storage medium, wherein the non-transitory computer-readable storage medium stores instructions, and when the instructions are run on a computer of a first satellite, the computer is enabled to perform operations comprising:
obtaining a protocol data unit (PDU), wherein the PDU comprises first information, the first information comprises an identifier of a user plane function network element (UPF) agent, and the identifier of the UPF agent indicates one of one or more UPF agents associated with a last-hop satellite; and
forwarding the PDU to a second satellite, wherein the second satellite is a next hop that is of the first satellite, that corresponds to the first information, and that is determined from at least one correspondence pre-stored by the first satellite, and each of the at least one correspondence indicates a correspondence between one piece of first information and a next hop.

17. The non-transitory computer-readable storage medium according to claim 16, wherein the first information further comprises an inter-satellite link (ISL) quality of service (QoS) level, and the ISL QoS level indicates a QoS requirement of inter-satellite communication.

18. The non-transitory computer-readable storage medium according to claim 17, wherein the ISL QoS level is one of at least one predefined ISL QoS level, and each of the at least one predefined ISL QoS level indicates different QoS requirements of the inter-satellite communication.

19. The non-transitory computer-readable storage medium according to claim 16, wherein obtaining the PDU comprises:
encapsulating, by the first satellite, received data based on the first information to obtain the PDU.

* * * * *